H. NOSTER.
HUB ATTACHING DEVICE.
APPLICATION FILED JUNE 19, 1912.
1,067,367.
Patented July 15, 1913.
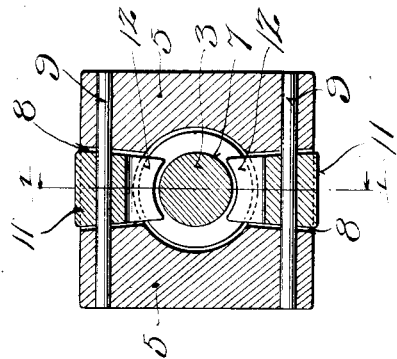
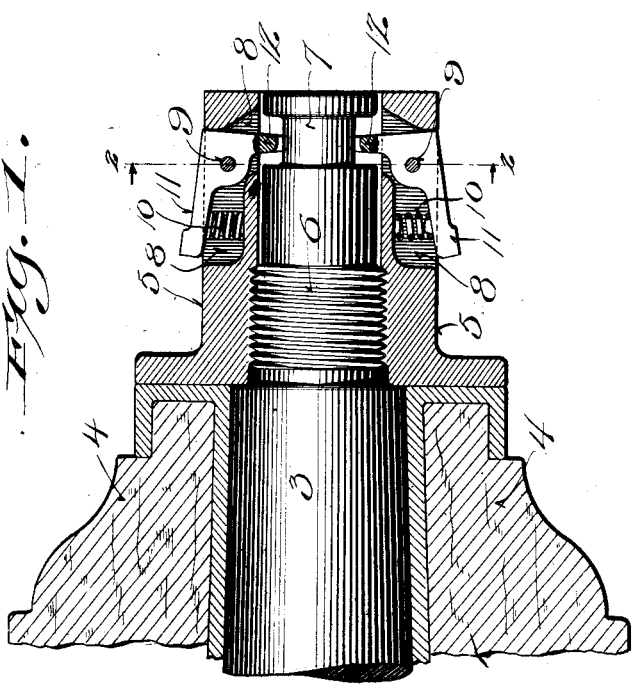

UNITED STATES PATENT OFFICE.

HUGO NOSTER, OF RANDOM LAKE, WISCONSIN.

HUB-ATTACHING DEVICE.

1,067,367. Specification of Letters Patent. Patented July 15, 1913.

Application filed June 19, 1912. Serial No. 704,490.

*To all whom it may concern:*

Be it known that I, HUGO NOSTER, a citizen of the United States, and resident of Random Lake, in the county of Sheboygan and State of Wisconsin, have invented certain new and useful Improvements in Hub-Attaching Devices; and I do hereby declare that the following is a full, clear, and exact description thereof.

My invention consists in what is herein particularly set forth with reference to the accompanying drawings and pointed out in the claim of this specification, its object being to provide against automatic disengagement of hub-opposing nuts from axles, my means to that end being simple, economical and efficient.

Figure 1 of the drawings is generally indicated by line 1—1 in Fig. 2, and represents a longitudinal section view of a fragment of a hub and an opposing nut on a fragment of an axle, the nut being provided with axle-engaging spring-latches. Fig. 2 represents a cross-section on the plane indicated by line 2—2 in Fig. 1.

Referring by numerals to the drawings, 3 indicates an end of a vehicle-axle, 4 a bushed wheel hub, and 5 a hub-opposing flanged nut run on a reduced and screw-threaded portion 6 of the axle. Outward from its thread, the axle further has a non-threaded reduction provided with an annular play-groove 7.

The nut is provided in an outer non-threaded portion thereof with opposite side recesses 8 that communicate at their outer ends with its bore, and engaging said recesses on pivot-pins 9 are right-angle latches. Springs 10 are arranged in the nut-recesses, back of the openings thereof to the nut-bore, to oppose the shank-ends 11 of the latches and thus hold said latches in normally tilted position against angular outer shoulders of said recesses, their tongue-ends 12 being engaged with the annular play-groove 7 of the axle when the nut is run on said axle, against the opposing hub. To remove the nut from the axle it is evidently necessary to manipulate the latches therewith, against spring-pressure, to retract their tongue-ends from the groove 7 in the axle.

When the nut is run on the axle, the end of said axle will automatically tilt the latches away from the opposing shoulders of the nut-recesses and clear the tongue-ends of said latches, but reverse play-movement of said nut will result in a bind of the latches in their normally tilted position. Hence it is impossible for the nut to automatically disengage from the axle.

I claim:

The combination of an axle, a wheel thereon, a flanged nut run on a reduced screw-threaded portion of the axle against the hub of the wheel and provided with opposite angularly shouldered recesses in a non-threaded portion thereof communicating with its bore, said axle being further reduced and non-threaded within the non-threaded portion of the nut, right-angle latches pivoted in the nut-recesses to have tongue-ends thereof engage an annular groove with which the non-threaded reduction of the axle is provided, and springs arranged in said nut-recesses to expand against shank-ends of the latches, said springs serving to normally hold said latches in tilted position against the angular shoulders of the aforesaid nut-recesses.

In testimony that I claim the foregoing I have hereunto set my hand at Random Lake, in the county of Sheboygan and State of Wisconsin in the presence of two witnesses.

HUGO NOSTER.

Witnesses:
C. P. SCHOMMER,
E. W. WIESE.